US009636876B2

(12) United States Patent
Lee et al.

(10) Patent No.: US 9,636,876 B2
(45) Date of Patent: May 2, 2017

(54) METHOD, DEVICE AND APPARATUS FOR VACUUM FORMING COMPOSITE LAMINATES

(71) Applicant: The Boeing Company, Chicago, IL (US)

(72) Inventors: Byungwoo Lee, Kirkland, WA (US); Andrew Elmer Modin, Charleston, SC (US); James Christopher Elm, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 267 days.

(21) Appl. No.: 14/527,162

(22) Filed: Oct. 29, 2014

(65) Prior Publication Data

US 2016/0121560 A1 May 5, 2016

(51) Int. Cl.
*B29C 70/44* (2006.01)
*B29C 70/34* (2006.01)
*B29D 99/00* (2010.01)
B29K 105/08 (2006.01)
B29K 307/04 (2006.01)
B29L 31/30 (2006.01)

(52) U.S. Cl.
CPC .......... *B29C 70/443* (2013.01); *B29C 70/342* (2013.01); *B29C 70/446* (2013.01); *B29D 99/0003* (2013.01); *B29K 2105/0872* (2013.01); *B29K 2307/04* (2013.01); *B29L 2031/3082* (2013.01)

(58) Field of Classification Search
CPC ... B29C 70/443; B29C 70/342; B29C 70/446; B29D 99/0003; B29L 2031/3082
See application file for complete search history.

(56) References Cited

U.S. PATENT DOCUMENTS

| 5,648,109 | A | 7/1997 | Gutowski et al. |
| 5,772,950 | A | 6/1998 | Brustad et al. |
| 6,406,580 | B1 | 6/2002 | Campbell, Jr. |
| 7,534,387 | B2 | 5/2009 | Zenkner et al. |
| 7,622,066 | B2 * | 11/2009 | Brustad ................. B29C 70/44 264/257 |
| 8,142,181 | B2 | 3/2012 | Willden et al. |
| 8,551,380 | B2 | 10/2013 | Hawkins et al. |
| 8,556,618 | B2 | 10/2013 | Bergmann |
| 2010/0102482 | A1 | 4/2010 | Jones et al. |
| 2014/0103585 | A1 | 4/2014 | Coxon et al. |
| 2014/0190625 | A1 | 7/2014 | Buttrick et al. |

FOREIGN PATENT DOCUMENTS

| EP | 1243401 A1 | 9/2002 |
| EP | 2662203 A2 | 11/2013 |

OTHER PUBLICATIONS

Extended European Search Report, dated Mar. 15, 2016, regarding Application No. EP15188221.4, 8 pages.
Modin et al., "Method and Apparatus for Forming Contoured Composite Laminates," U.S. Appl. No. 14/279,725, filed May 16, 2014, 68 pages.

* cited by examiner

*Primary Examiner* — Robert B Davis
(74) *Attorney, Agent, or Firm* — Yee & Associates, P.C.

(57) ABSTRACT

Composite prepreg plies are formed and compacted on a contoured tool by a compliant former device using compaction force applied by a vacuum diaphragm. The former device is configured to first clamp and then sweep the plies over features of the tool in a desired sequence.

20 Claims, 14 Drawing Sheets

METHOD, DEVICE AND APPARATUS FOR VACUUM FORMING COMPOSITE LAMINATES

BACKGROUND INFORMATION

1. Field

The present disclosure generally relates to fabrication of composite laminates, and deals more particularly with a method, device and apparatus for vacuum forming a composite laminate.

2. Background

Composite laminate stiffeners are sometimes required to have complex contours tailored to particular applications. For example, in the aircraft industry, composite laminate stringers used to stiffen aircraft skins are sometimes contoured in one or more planes in order to match changes in the skin geometry often found in aerodynamic fuselages and airfoils.

Layup and forming of composite laminate stiffeners having complex contours can be challenging because composite prepreg material may bridge or wrinkle in the areas of contours. In order to minimize these conditions, composite laminate structural stiffeners such as stringers are usually laid up by hand; however, hand layup of stiffeners is both labor-intensive and time-consuming, and therefore expensive. Automation of forming and compacting of contoured composite stiffeners may require complex, heavy and/or expensive equipment.

Accordingly, there is a need for a method, device and apparatus for forming and compacting contoured composite stiffeners such as composite laminate prepreg stringers, that reduce part non-conformities and touch labor. There is also a need for a method, device and apparatus of the type mentioned above which obviate the need for specialized, heavy forming equipment, and rely on conventional vacuum diaphragms to develop the necessary forming pressures.

SUMMARY

The disclosed embodiments provide automated passive forming and compacting of contoured composite laminate structures using a simple, compliant former device and compaction pressures applied by a conventional vacuum diaphragm. Touch labor and part non-conformities are reduced. The embodiments also reduce equipment costs and avoid the need for highly specialized tooling. The compliant former device includes forming features that apply compaction pressure to prepreg plies in a desired sequence in order to reduce or eliminate ply wrinkling and/or buckling. Forming pressure is supplied solely by vacuum pressure applied to the vacuum diaphragm. The compliant former device is segmented, allowing it flex and comply with local contours throughout the length of the tool. The embodiments may also be employed to form and compact composite laminate structures that are not contoured, such as straight stringers.

According to one disclosed embodiment, apparatus is provided for forming a composite laminate structure. Prepreg plies are placed on a tool having contoured tool surfaces on which the plies are to be formed. A former device is configured to be placed on the prepreg plies and form the plies onto the contoured tool surfaces. The former device includes a plurality of forming segments and flexible connections between the forming segments. Each of the forming segments is configured to form a portion of the plies on the contoured tool surfaces. A flexible vacuum diaphragm covers the plies and is configured to be evacuated and compact the former device down onto the tool. The flexible connections may include flexible lines threaded through the forming segment and/or snap-fit joints configured to allow one or more of the forming segments to be added or removed from the former device. In one form, each of the flexible connections includes a cone, and a cup for receiving the cone. The tool may include a cap section, a pair of flange sections, and a pair of web sections connecting the flange sections. Each of the forming segments includes a body configured to hold the plies against the cap section, and forming fingers configured to sweep the plies over the web sections and onto the flange sections. The body includes a clamping member configured to clamp the plies against the cap section, and a spring coupled with the clamping member and configured to bias the clamping member toward the cap section. Each of the forming segments further includes flexible connections between the forming fingers and the body, wherein the flexible connections are configured to allow the forming fingers to flex relative to the body. The body, the flexible connections and the forming fingers are integrally formed together and each is flexible.

According to another disclosed embodiment, a device is provided for forming prepreg plies onto a contoured tool having cap section, a pair of flange sections and a pair of web sections connecting the flange sections to the cap. The device includes a body, a pair of forming fingers and a pair of flexible connections. The body is configured to be placed on the plies overlying the cap. The forming fingers are respectively configured to sequentially sweep the plies over the web sections and down onto the flange sections. The flexible connections respectively connect the forming fingers with opposite sides of the body. The body is flexible and each of the flexible connections includes a live hinge. Each of the forming fingers is also flexible and includes inner extremities configured to sweep the plies over the web sections of the tool. The body, the forming fingers and the flexible connections are of a unitary one-piece construction. The device may also include a clamping member connected with the body and configured to clamp the plies on the cap section, and a spring coupled between the body and the clamping member for biasing the clamping member toward the cap section. The spring and the clamping member may be integrally formed together.

According to another embodiment, a device is provided for forming prepreg plies onto a tool. The device includes a body configured to be placed on the plies overlying the tool, and a pair of forming fingers respectively configured to sequentially sweep the plies over the tool. The device also includes a pair of flexible connections respectively connecting the pair of forming fingers with opposite sides of the body. The flexible connections include folds of flexible spring-like material. The folds may be formed integral with the forming fingers. The flexible connections are attached at medial locations between opposite extremities of the forming fingers. The body may include a clamp for clamping the plies on the tool.

According to still another embodiment, a method is provided of forming prepreg plies on a tool having a cap section, a pair of flange sections and a pair of web sections connecting the flange sections with the cap section. The plies are placed on the tool overlying the cap section, and a former device is placed on the plies. A vacuum diaphragm is installed over the plies covering the former device, and a compaction force is generated by evacuating the vacuum diaphragm. The former device is compacted against the tool using the compaction force applied by the vacuum diaphragm, and the plies are sequentially swept over the cap section, the web sections and the flange sections. The method may also include clamping the plies against the cap section of the tool.

According to still another embodiment, a method is provided of forming prepreg plies on an elongate tool having a lengthwise contour. A former device is assembled by flexibly connecting a plurality of former segments, each configured to form a section of the prepreg plies on the elongate tool. Prepreg plies are placed on the tool, and the former device is configured to substantially match the lengthwise contour of the tool. The former device is compacted against the tool to form the prepreg plies onto the tool. The method may also include sealing a vacuum bag over the plies, and generating a compaction force by evacuating the vacuum bag.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
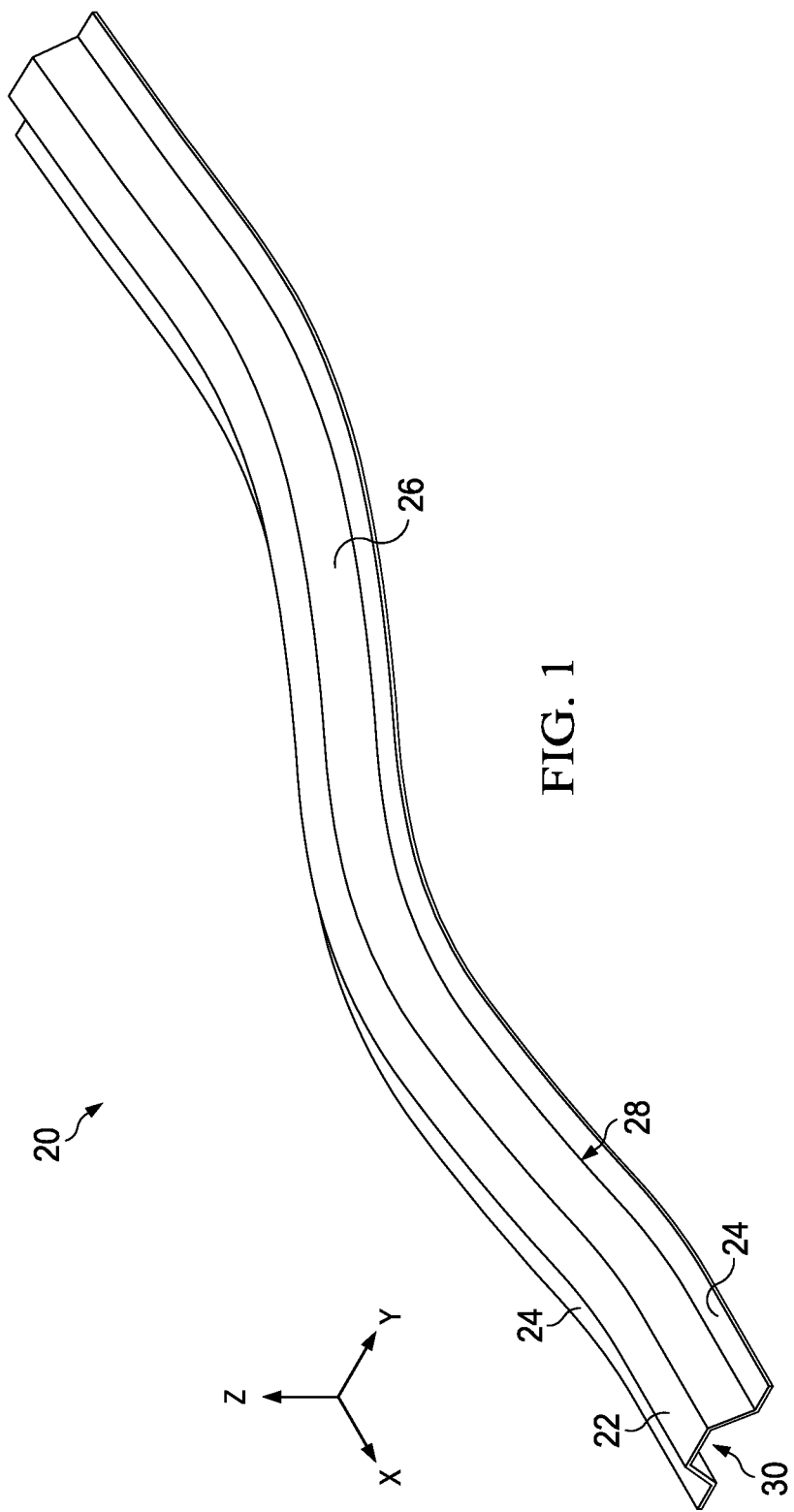
FIG. 1 is an illustration of a perspective view of a composite laminate stringer having multiple contours along its length.

Referring first to FIG. 1, the disclosed embodiments relate to a method, device and apparatus for vacuum forming and compacting an elongate composite laminate structure that may have one or more contours along its length. In the example shown in FIG. 1, the composite laminate structure is a stringer 20, however it is to be understood that the disclosed embodiments may be employed to form and/or compact a variety of other structural members, including those that may not be contoured along their length. The stringer 20 comprises laminated plies (not individually shown in FIG. 1) of prepreg such as, without limitation, CFRP (carbon fiber reinforced plastic).

The stringer 20 has a hat-shaped cross-section 30 formed by a cap 22 connected to a pair of laterally extending flanges 24 by a pair of webs 26. Each flange 24 transitions into a corresponding web 26 along a lower inside radius 28. The stringer 20 may include one or more contours along its length in either or both of the XY and XZ planes. Although not shown in FIG. 1, the stringer 20 may also be twisted along the X-axis. As mentioned earlier, the disclosed embodiments may be employed to form and/or compact structural members having other cross sectional geometries. For example, and without limitation the disclosed embodiments may be employed to form and/or compact composite stringers having a cross sectional shape that is closed rather than open, and other generally convex cross sectional shapes such as hemispherical shapes and omega shapes that may or may not include radii.

Figure 2:
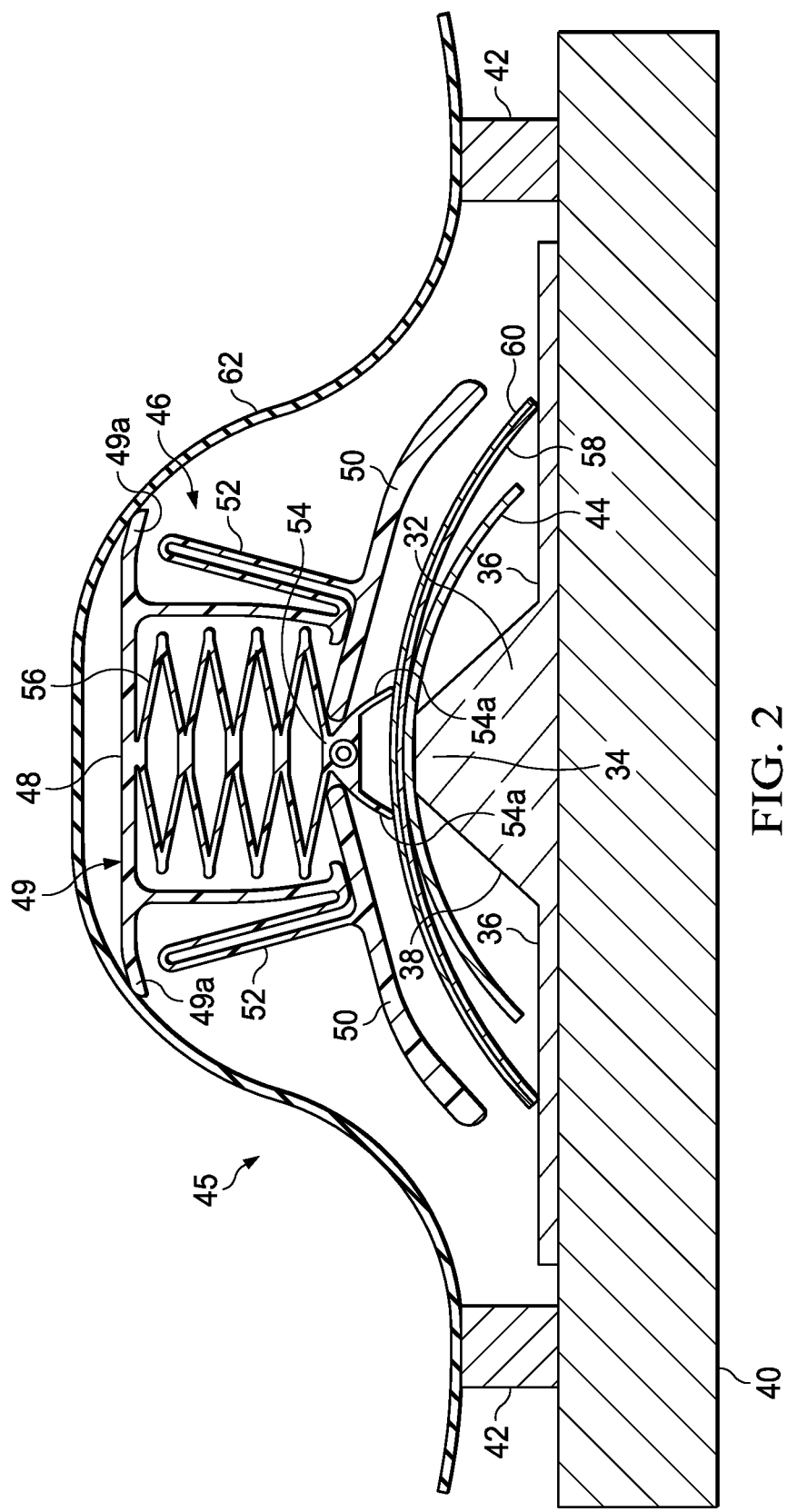
FIG. 2 is an illustration of a cross-sectional view of apparatus for forming and compacting the stringer shown in FIG. 1, set-up in preparation for a forming operation.

Attention is now directed to FIG. 2 which illustrates a device 46 and apparatus 45 for forming and/or compacting one or more prepreg plies 44 on a mandrel-like, elongate tool 32. The apparatus 45 may rely solely on vacuum pressure for forming and compacting the plies 44, and thus employs a "passive" method of forming the plies 44. The apparatus 45 broadly comprises a compliant ply former device 46, hereinafter simply referred to as a "former device" 46, which forms one or more prepreg plies 44 onto the tool 32 using a compaction force generated by a flexible diaphragm 62. The flexible diaphragm 62 may comprise a reusable type diaphragm, or a conventional consumable vacuum bag that covers the plies 44 and is sealed around its periphery. The tool 32 is mounted on a tool base 40 having standoffs 42 thereon which surround the tool 32. The standoffs 42 assist in elevating and holding the peripheral edges of the flexible diaphragm 62 during the forming process, however, depending on the application, it may not be necessary to use standoffs 42.

The tool 32 includes a cap section 34, a pair of flange sections 36 and a pair of web sections 38, all of which substantially match the geometry of the stringer 20. Although not shown in FIG. 2, the tool 32 may have one or more contoured tool surfaces along its length matching corresponding contours of the stringer 20. For example, the tool 32 may have features suitable for forming and/or compacting composite stringers having any of various, generally convex cross-sectional shapes, including but not limited to hemispherical shapes and omega shapes that may or may not include radii.

The former device 46 broadly comprises a flexible body 48 and a pair of flexible forming fingers 50 respectively extending laterally from opposite sides of the body 48. The forming fingers 50 are coupled with the body 48 by a pair of flexible connections 52 which are spring-like to allow the forming fingers 50 to flex relative to the body 48 during a ply forming operation, while transmitting forming pressure to the forming fingers 50. The former device 46 further includes a centrally located, foot-like clamping member 54 that is coupled with the body 48 by a spring 56 or similar device which biases the clamping member 54 toward the cap section 34 of the tool 32.

The clamping member 54 includes downwardly extending guide arms 54a that overlie the top of the web sections 38. The guide arms 54a assist in guiding and centering the former device 46 on the centerline of the cap section 34 when the former device 46 is initially placed on and later drawn down onto the tool 32. In some embodiments, one or both the guide arms 54a may be incorporated into the forming fingers 50. As will be discussed below in more detail, the clamping member 54 along with the guide arms 54a also function to compact the plies 44 against the cap section 34 and roll them over the upper radius located at the intersection of the cap area 34 and the web 38.

The body may be formed of any suitable flexible material which allows the body 48 to deform slightly as the ply 44 is being formed and compacted down onto the tool 32. Similarly, the forming fingers 50 and the flexible connections 52 may be formed of flexible, deformable material. For example, without limitation, the body 48, flexible connections 52 and forming fingers 50, as well as the clamping member 54 and spring 56 may be formed of any of a variety of plastic materials commonly used in additive manufacturing processes such as, without limitation, thermoplastics. However, other materials may be used, including metals and composites providing they provide the former device 46 with the necessary compliance and flexibility.

The flexible connections 52 may comprise folds of flexible spring-like material which transmit compaction force to the forming fingers 50 while allowing the forming fingers to flex relative to the body 48. The flexible connections 52 are attached to the forming fingers 50 at medial locations, between opposite extremities of the forming fingers 50. The forming fingers 50 are also configured to flex and/or deform during the forming/compaction process. Thus, the body 48 as well as the forming fingers 50 are compliant and may deform to some degree during the forming process in order to transfer compaction force to the plies 44 that is generated by the vacuum diaphragm 62, as will be described below in more detail. The top 49 of the body 48 includes outer extremities 49a which overhang the flexible connections 52 and function to prevent the vacuum diaphragm 62 from inwardly pinching the flexible connections 52 as the vacuum diaphragm 62 is drawn down onto the former device 46.

In one embodiment, the body 48, flexible connections 52 and forming fingers 50 are integrally formed together of the same material. As will become apparent below, both the clamping member 54 and the spring 56 may also be integrally formed with the body 48. Optionally, the body 48 may be filled with resilient foam (not shown) which augments the spring force applied to the clamping member 54 by the spring 56. Alternatively, in some embodiments, the resilient foam may apply sufficient force to the clamping member 56, such that a separate spring 56 may not be required. It should be noted here that the disclosed former device 46 may be employed to form and compact composite laminate structures such as the stringer 20 that are not contoured along their length i.e. straight stringers 20. However, in applications where the stringer 20 has one or more contours along its length, the former device 46 may be configured to match the stringer contours by segmenting the former device 46, as will be described below in more detail.

Figure 3:
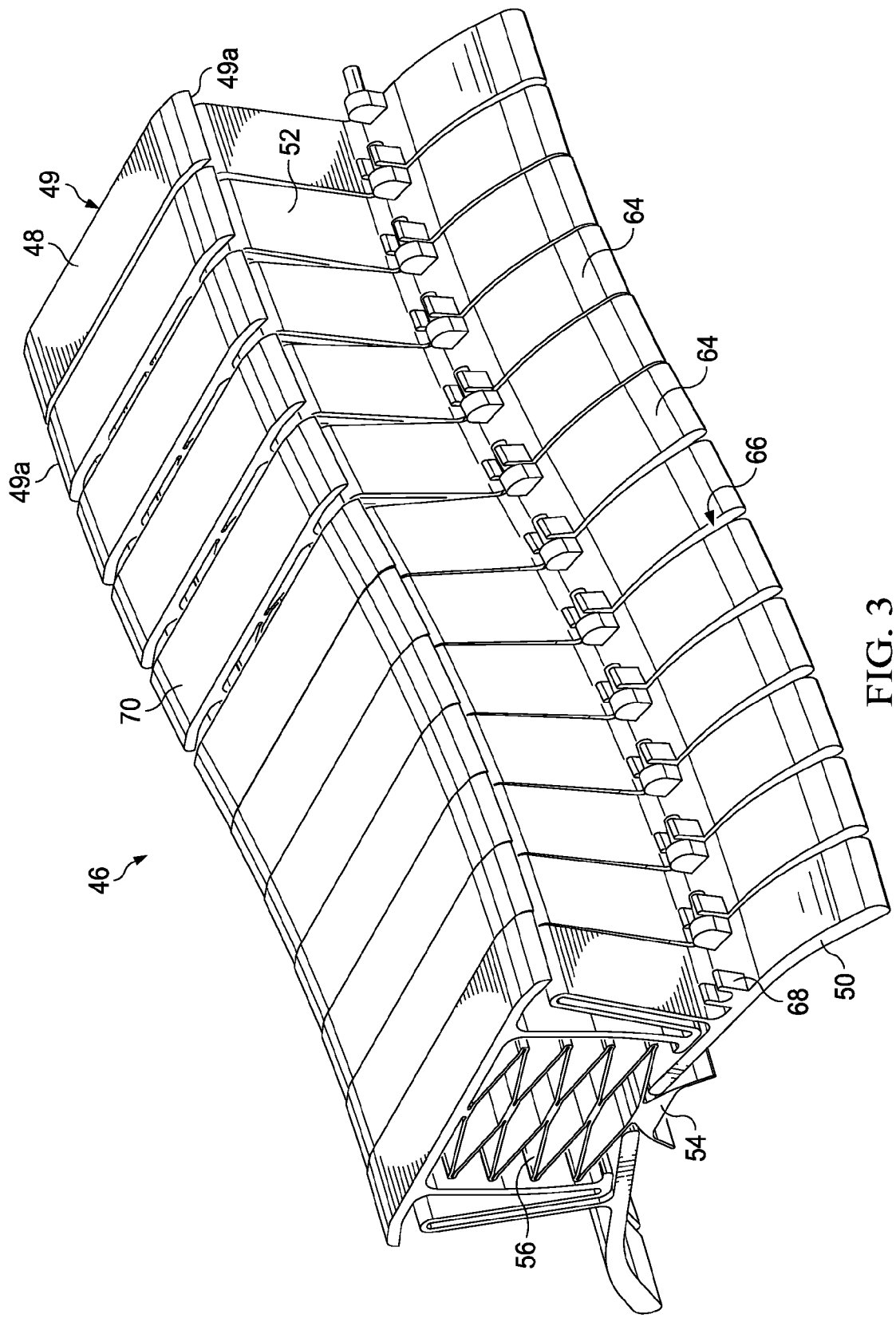
FIG. 3 is an illustration of a perspective view of one embodiment of a compliant ply former device employed in the apparatus shown in FIG. 2.

Attention is now directed to FIG. 3 which illustrates additional details of one embodiment of the former device 46 which is suitable for forming and compacting contoured stringers 20 and similar composite laminate structures. In this example, the former device 46 comprises a plurality of former segments 64 that are coupled together by flexible segment connections 68 which permit the former segments 64 to flex in either or both the XY and XZ planes, as well as to twist around the X-axis (i.e. longitudinal axis of the former device 46). Thus, for example, the former device 46 may be configured to match serpentine like contours of the tool 32 in the XY plane as well as curves or contours in the XZ plane. Each of the former segments 64 is configured to form a portion of the plies 44 on the tool 32. In this exemplar, the flexible segment connections 68 comprise snap-fit flexible joints that are integrally formed with the forming fingers 50, however other types of flexible segment connections 68 are possible, as will become apparent below. The snap-fit form of the flexible segment connections 68 shown in FIG. 3 allow the former segments 64 to be quickly added or removed in order to adjust the overall length of the former device 46.

Figure 4:
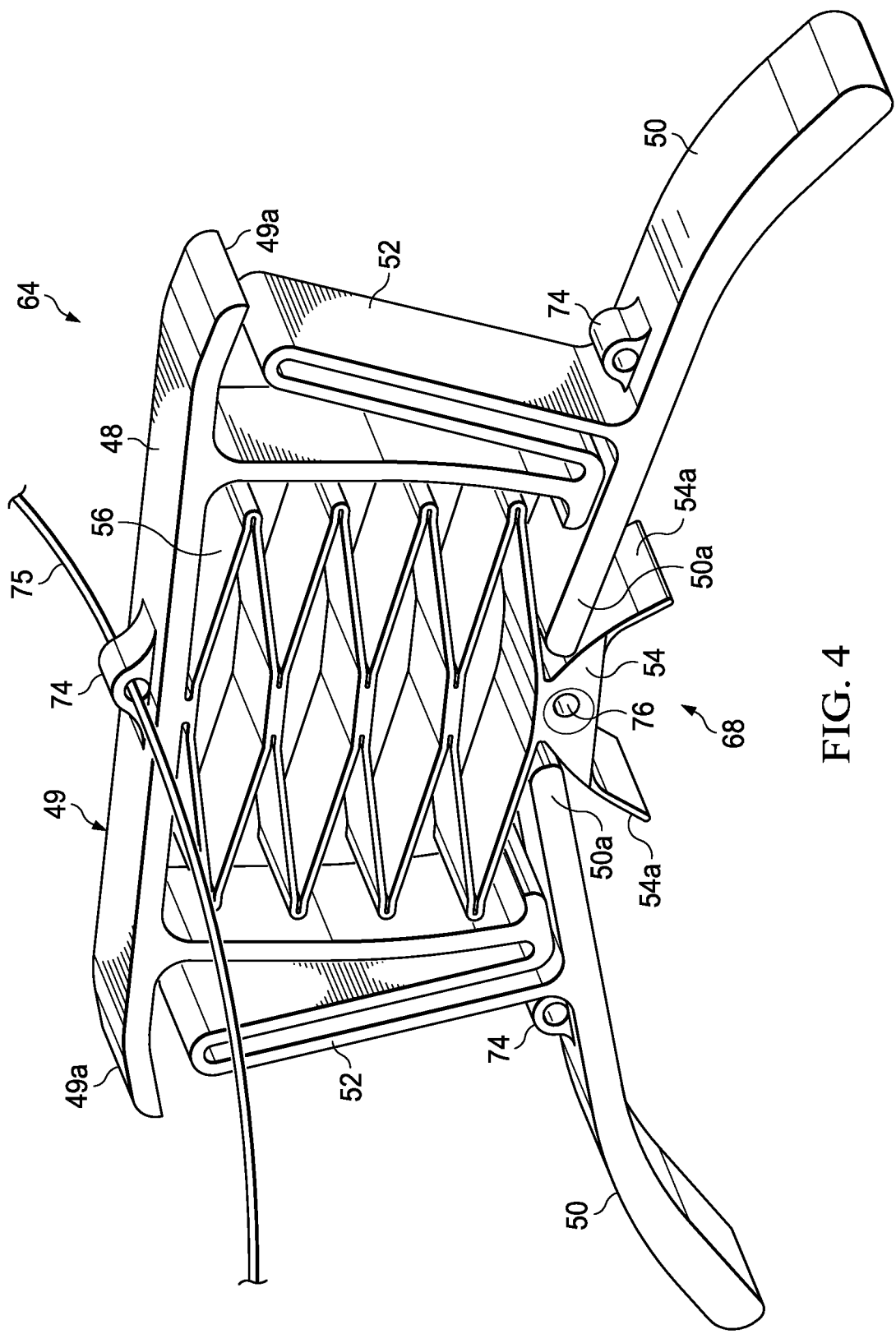
FIG. 4 is an illustration of a perspective view of one side of an embodiment of a device segment forming part of the ply former device shown in FIG. 3.
Figure 5:
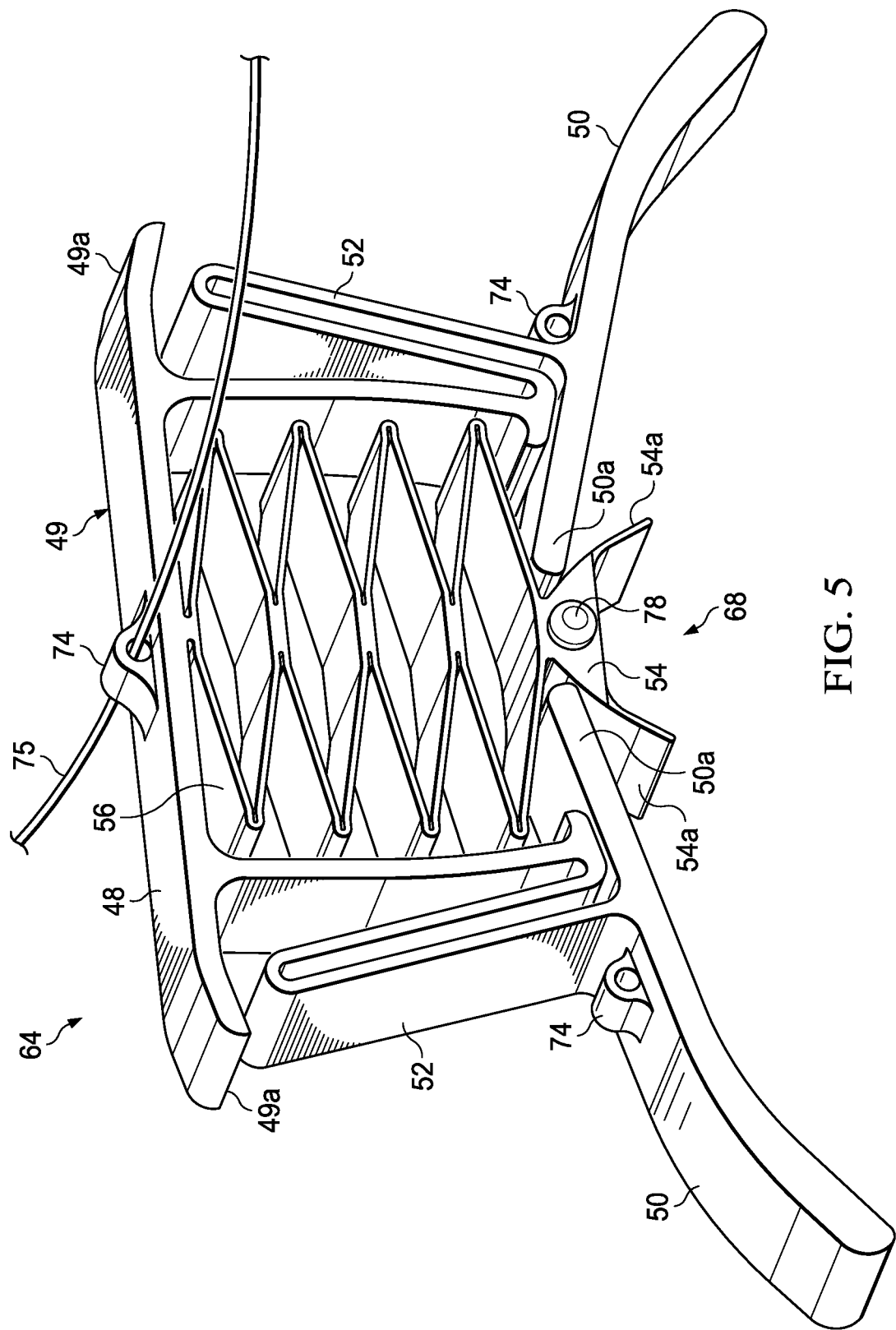
FIG. 5 is an illustration similar to FIG. 4 but showing the opposite side of the device segment.

In order to facilitate flexing of the segments relative to each other, the flexible segment connections 68 are configured to form relatively small spaces 66 between the former segments 64. In the embodiment shown in FIG. 3, each of the former segments 64 is of unitary one-piece construction, and the spring 56 comprises a criss-crossed web of spring elements that is integrally formed with the clamping member 54 and the body 48. The width of the former segments 64 may depend upon the application. Generally, former segments 64 that are thinner (narrower in width) may accommodate more severe tool contours, while former segments 64 that are thicker (wider) may be suitable for tools 32 having contours that are less severe. In some embodiments, depending upon the contouring of the tool 32, the former device 46 may have a combination of thick and thin former segments 64 joined together. The top 70 of the body 48 of each former segment 64 is substantially flat to increase both the surface contact between the former device 46 and the vacuum diaphragm 62, and the directionality of compaction force applied by the vacuum diaphragm 62. It should be noted here that segmentation of the former device 46 as described above may be necessary to accommodate lengthwise contours of the tool 32, however, where the tool 32 does not have such contours, segmentation of the former device 46 may not be required. In other words, variations of the disclosed embodiments may be used to form and compact straight stringers FIGS. 4 and 5 illustrate an alternate embodiment of a former segment 64 in which the flexible segment connections 68 are integrally formed with the clamping member 54. In this example, the flexible segment connections 68 comprise a concave cup 76 on one side of the former segment 64 (FIG. 4), and a cone 78 (FIG. 5) on the opposite side of the former segment 64 which is received by and mates with a cup 76 on an adjacent former segment 64. The cup 76 and mating cone 78 effectively form a type of ball joint between the forming segments 64 that allow them to flex and/or rotate relative to each other. In other embodiments, the cup 76 and cone 78 may be configured as a snap-fit connection that also functions to hold the former segments 64 together. The cups 76 and cones 78 are configured to maintain a slight space 66 (see FIGS. 2 and 3) between the former segments 64 that allow the former segments 64 to freely move relative to each other during set up and forming operations.

Figure 6:
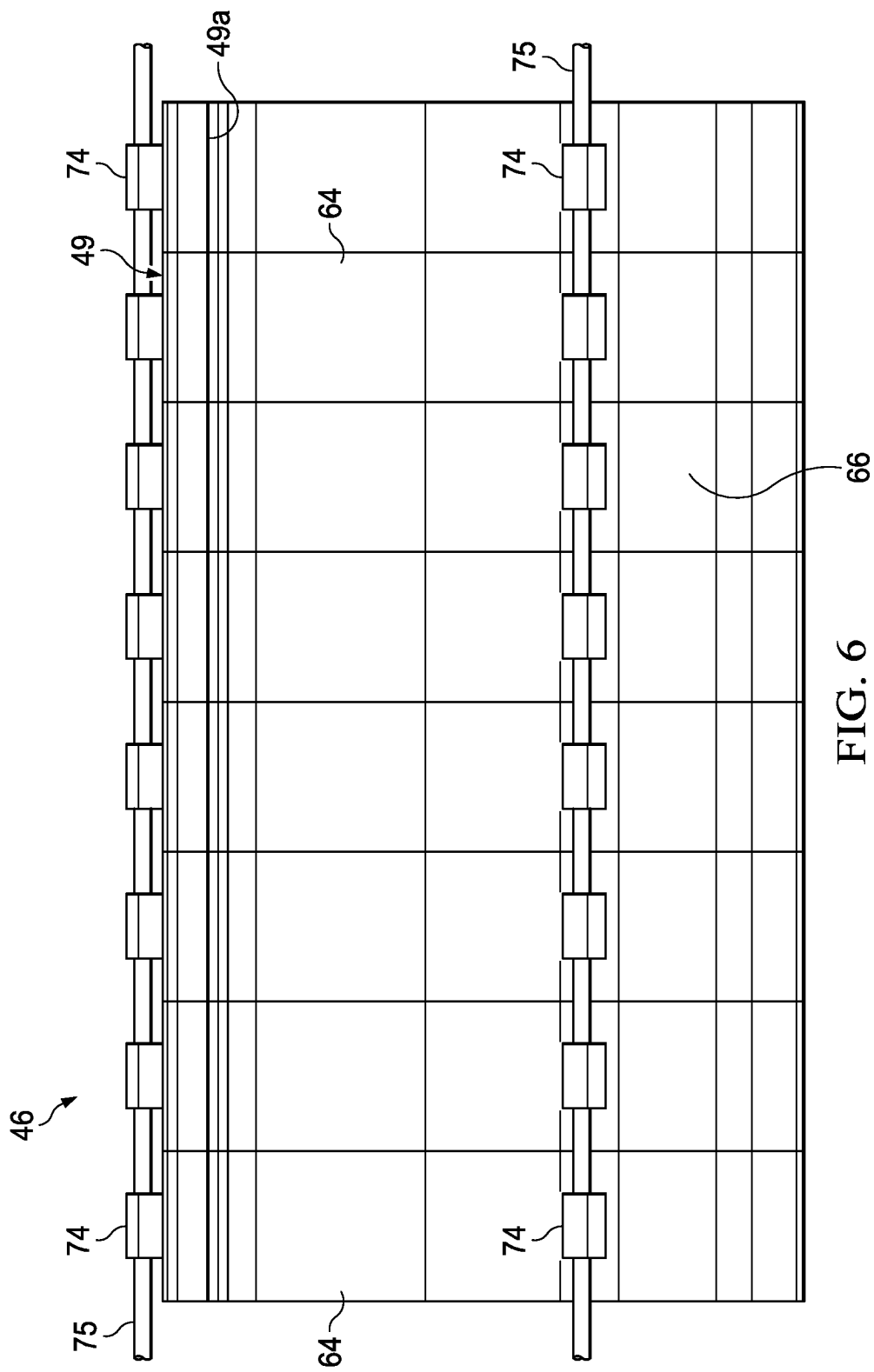
FIG. 6 is an illustration of a side elevational view of an assembled group of the device segments.

It may be possible to employ other mechanisms for flexibly interconnecting the former segments 64. For example, referring FIGS. 4, 5 and 6, each of the former segments 64 may be provided with one or more through hole loops 74 integrally formed with the body 48 and/or the forming fingers 50. A chord or similar flexible line 75 may be trained through the loops 74 of all of the former segments 64 in order to flexibly couple them together in a manner that allows the forming segments 64 to flex relative to each other. In some embodiments, the former segments 64 may include both ball joints formed by cups 76 and cones 78 as well as loops 74 having lines 75 trained therethrough. In this latter mentioned embodiment, the cups 76 and cones 78 form a flexible connection between the former segments 64 which slightly space the former segments 64 apart from each other, while the lines 75 function to hold the former segments 64 together as an assembly.

Figure 7:
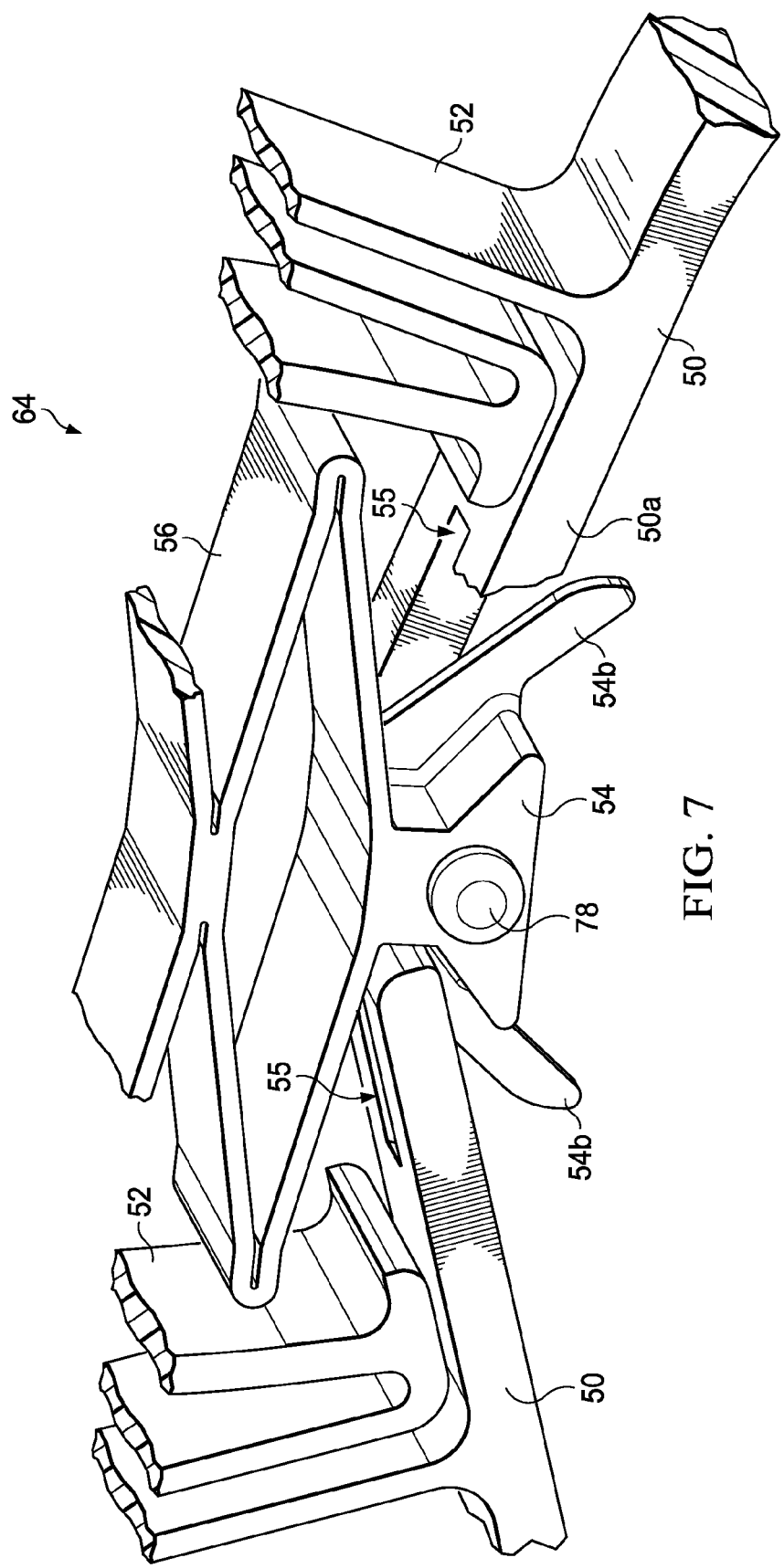
FIG. 7 is an illustration of a perspective view of one variation of the device segment shown in FIGS. 4 and 5, portions of one of the forming fingers broken away to reveal a slot.

FIG. 7 illustrates another embodiment of the former segment 64 which is similar in overall construction to the embodiment shown in FIGS. 4 and 5. In this embodiment of FIG. 7, however, blade-like guide arms 54b integrally formed with the clamping member 54 are arranged to pass through slots 55 in the inner extremities 50a of the forming fingers 50. During compaction, the guide arms 54b pass through the slots 55 as the inner extremities 50a move down and began forming the plies 44 against the upper most areas of the web section 38. In the embodiment shown in FIG. 7, the inner extremities 50a began transmitting forming force onto the web sections 38 earlier than occurs using the embodiment shown in FIGS. 4 and 5.

In the embodiments described above, each of the former segments 64 is of a one-piece, unitary construction, in which the body 48, forming fingers 50 and flexible connections 52 are integrally formed of the same material. The one-piece embodiment of the former segments 64 may be fabricated by additive manufacturing techniques such as 3-D printing, however other fabrication techniques are possible. For example, and without limitation, the former device 46 may be fabricated by first extruding a material through an extrusions die, and then cutting the former device 46 into a plurality of individual former segments 64. It may also be possible to fabricate each of the former segments 64 from multiple individual parts, such as linear or torsional slides, coupled with discrete hinges and pistons or the like (all not shown), which are then assembled together.

Attention is now directed to FIGS. 2 and 8-10 which sequentially illustrate forming and compaction of one or more plies 44 on the tool 32 using the compliant vacuum former device 46. As shown in FIG. 2, the apparatus 45 is initially set up by placing one or more plies 44 on the tool 32, substantially centered on the cap section 34 of the tool 32. A layer of FEP (fluorinated ethylene propylene) 60 or similar release film is draped over the plies 44 to isolate the plies 44 from an overlying layer 58 of TEFLON® coated glass fabric such as Armalon®. The Armalon® layer 58 protects the fibers of the plies 44 from distortion, reduces friction during forming and aids in distributing the applied compaction pressure. While FEP and are Armalon® may be employed as described above, various other films and bagging materials, either in single or multiple layers, may be used to protect the prepreg plies 44 while facilitating operation of the former device 46.

Next, the former device 46 is placed over the layup which consists of the plies 44, FEP 60 and the Armalon® layer 58, with the clamping member 54 substantially centered over the cap section 34 of the tool 32. A flexible vacuum diaphragm 62, which may comprise a vacuum bag, is then draped over the layup and sealed around its periphery to the standoffs 42. The vacuum diaphragm 62 overlies and contacts the top 49 of the body 48 of the former device 46. The portion 49a at the top 49 that overhang the flexible connections 52 prevent the vacuum diaphragm 62 from inwardly pinching and thereby interfering with the operation of the flexible connections 52.

Figure 8:
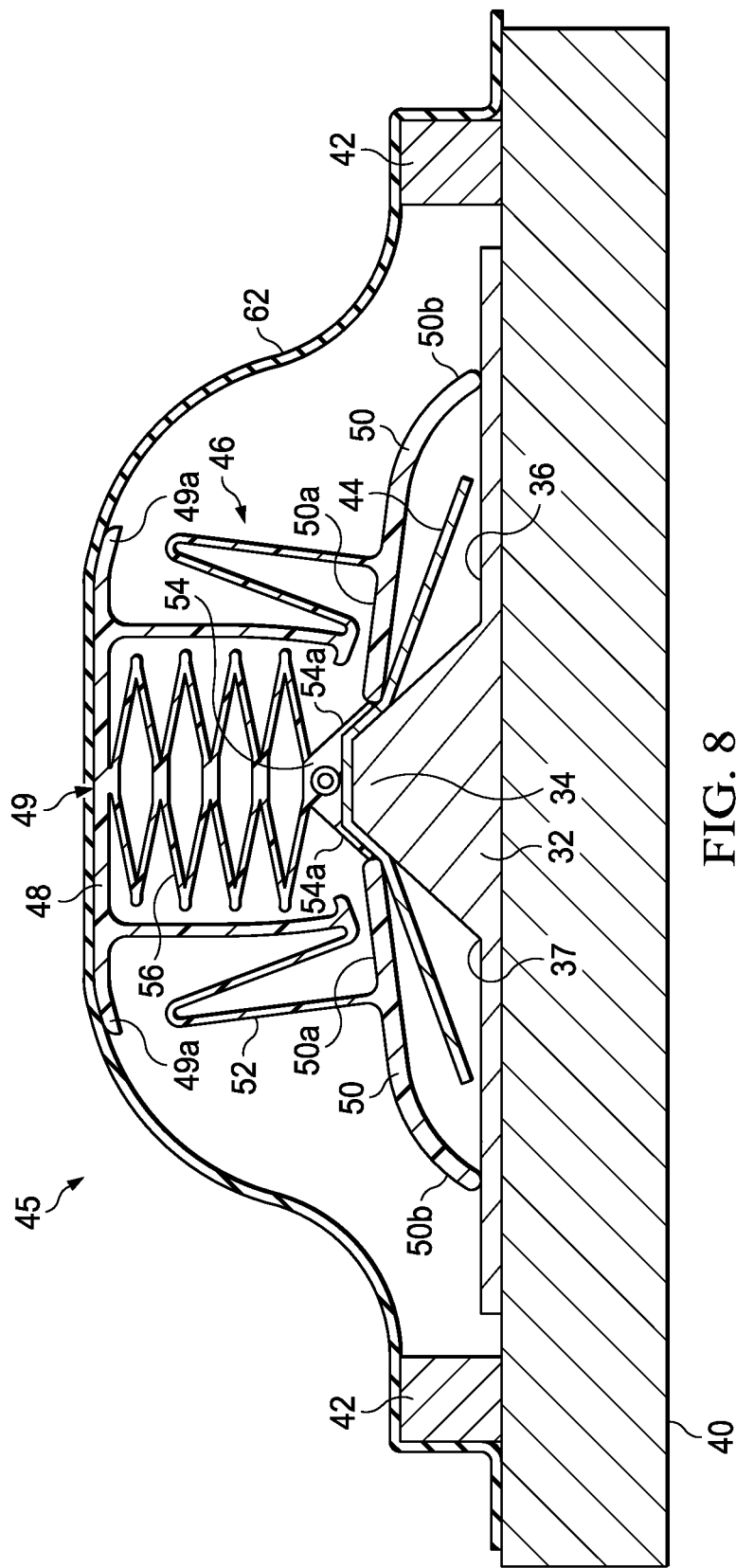
FIG. 8 is an illustration similar to FIG. 2, but showing the ply clamped onto the tool and having the webs thereof partially formed.
Figure 9:
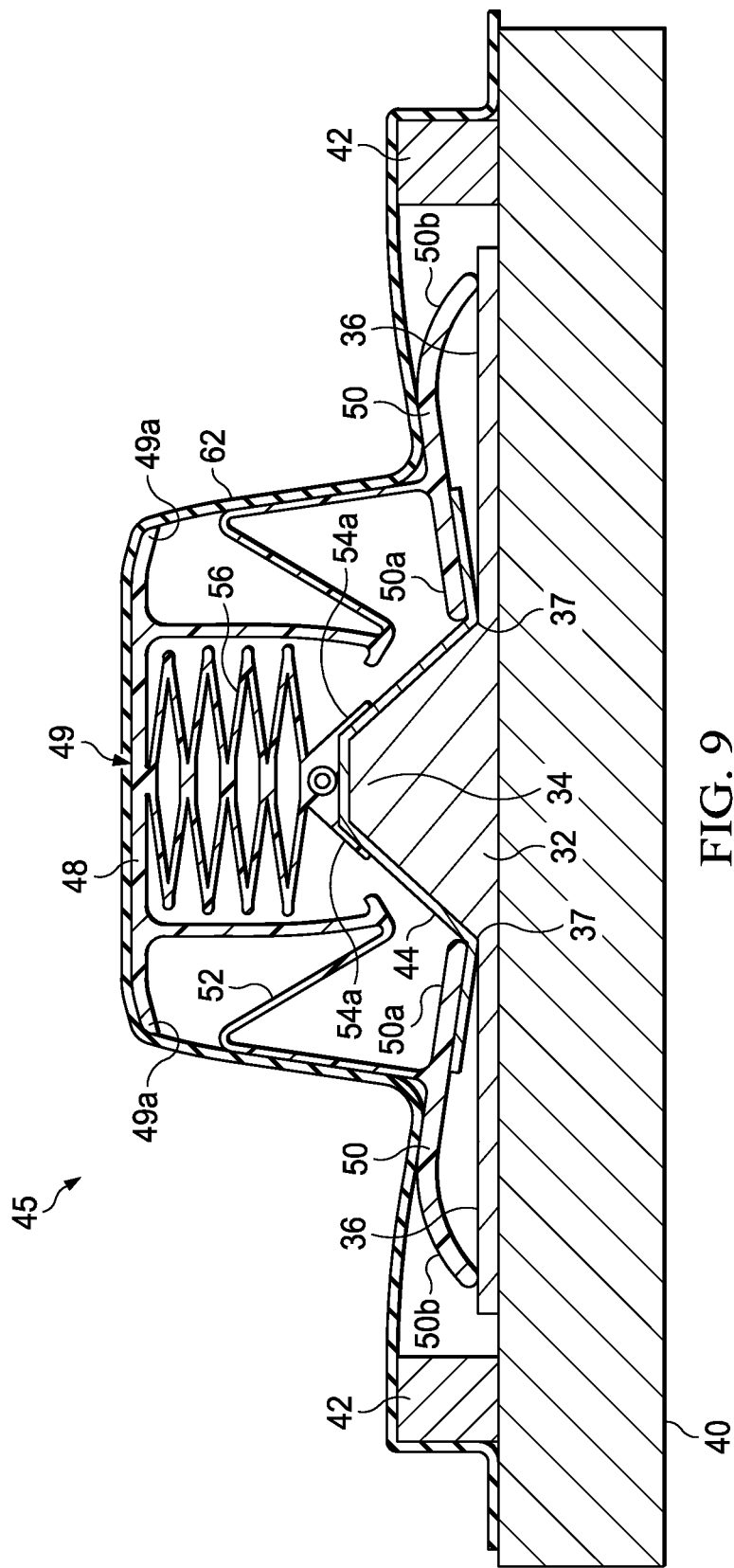
FIG. 9 is an illustration similar to FIG. 8 but showing the webs and lower inside radii having been fully formed.
Figure 10:
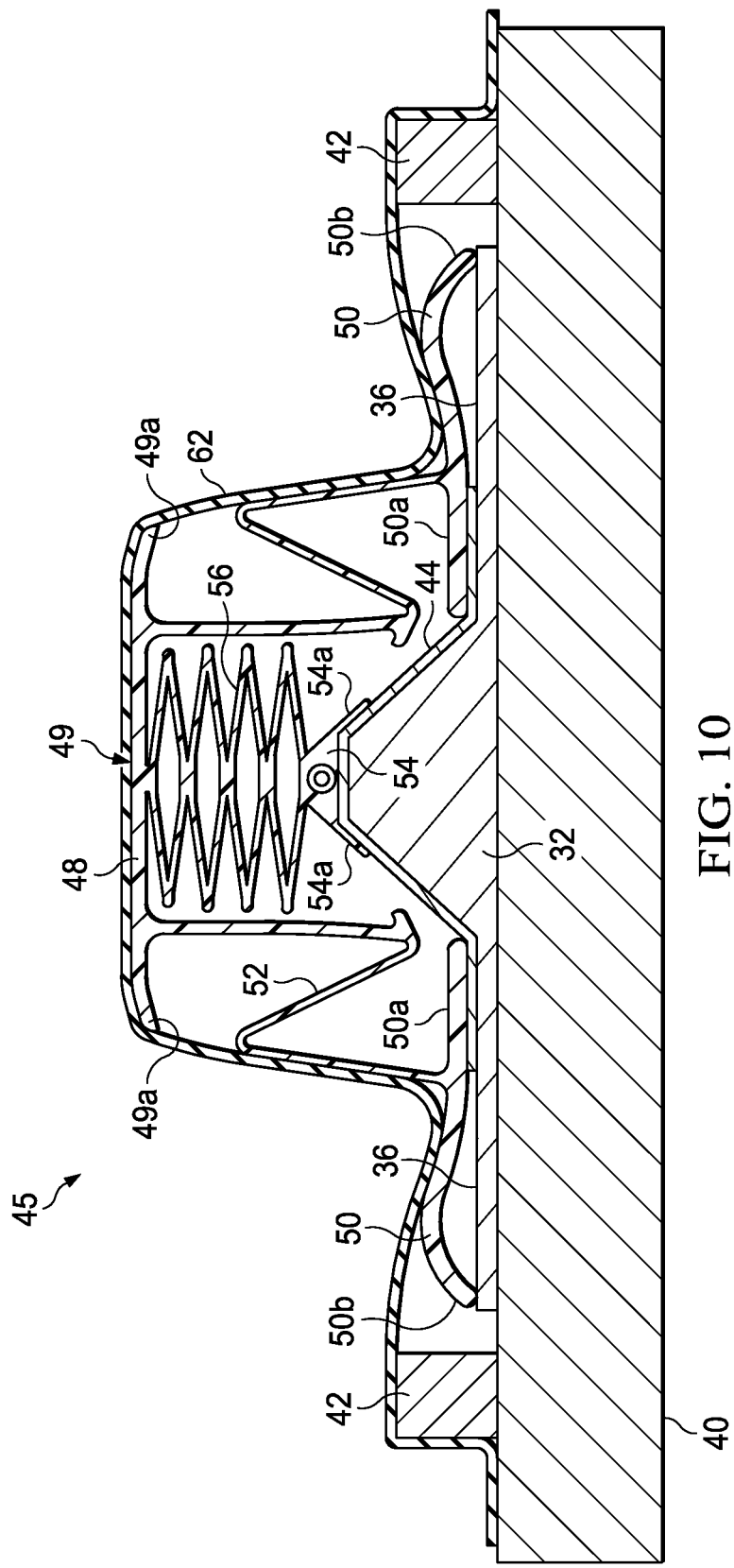
FIG. 10 is an illustration similar to FIG. 9, but showing a later stage of the forming process in which the flanges of the ply have been fully formed.

Referring to FIG. 8, following the setup procedure described above, the vacuum chamber formed by the sealed vacuum diaphragm 62 is evacuated at a controlled rate, causing the vacuum diaphragm 62 to be drawn down onto the layup, and apply compaction pressure to the forming device 46. The vacuum diaphragm 62 initially contacts the top 49 of the former body 48 and then forces the body 48 downwardly toward the cap section of the tool 32. The downward movement of the former body 48 loads the spring 56, causing the clamping member 54 to clamp the plies 44 against the cap section 34 of the tool 32. The plies 44 remained clamped against the cap section 34 throughout the remainder of the forming process described below.

As the former body 48 continues to move downwardly in reaction to the compaction pressure applied by the vacuum diaphragm 62, the applied compaction force is transmitted through the flexible connections 52 to the forming fingers 50, causing the inner extremities 50a of the forming fingers 50 to move downwardly into contact with the plies 44. The forming process begins in the cap/web radius at the intersection of the cap area 34. The applied compaction force deforms the body (see FIG. 8), forcing the forming fingers 50 to move laterally outward, and causing the inner extremities 50a to sweep and thereby form the plies 44 onto the web sections 38. The inner extremities 50a continue sweeping the plies 44 until they have been swept into the inside radii 37 (see FIG. 8) of the tool 32.

After the inner extremities 50a "bottom out" at the inside radii 37 (FIG. 9), continued compaction pressure applied by the flexible diaphragm 62 causes the forming fingers 50 to flex and deform until the inner extremities 50a flatten (see FIG. 10) against the flange sections 36 of the tool 32. Flattening of the inner extremities 50a against the flange sections 36 causes the plies 44 to be fully formed down against the flange sections 36.

Figure 11:
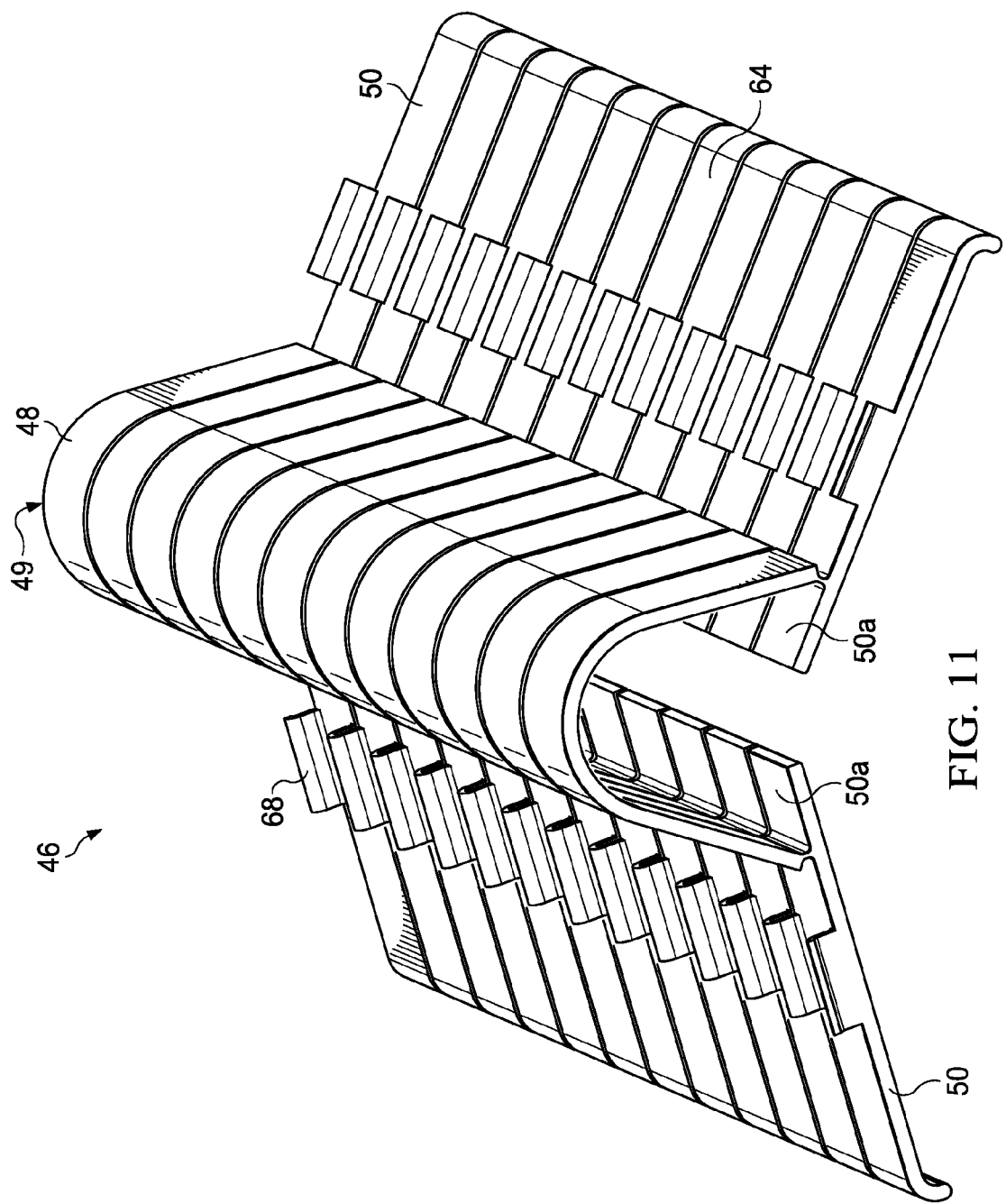
FIG. 11 is an illustration of a perspective view of an alternate embodiment of the compliant ply former device.
Figure 12:
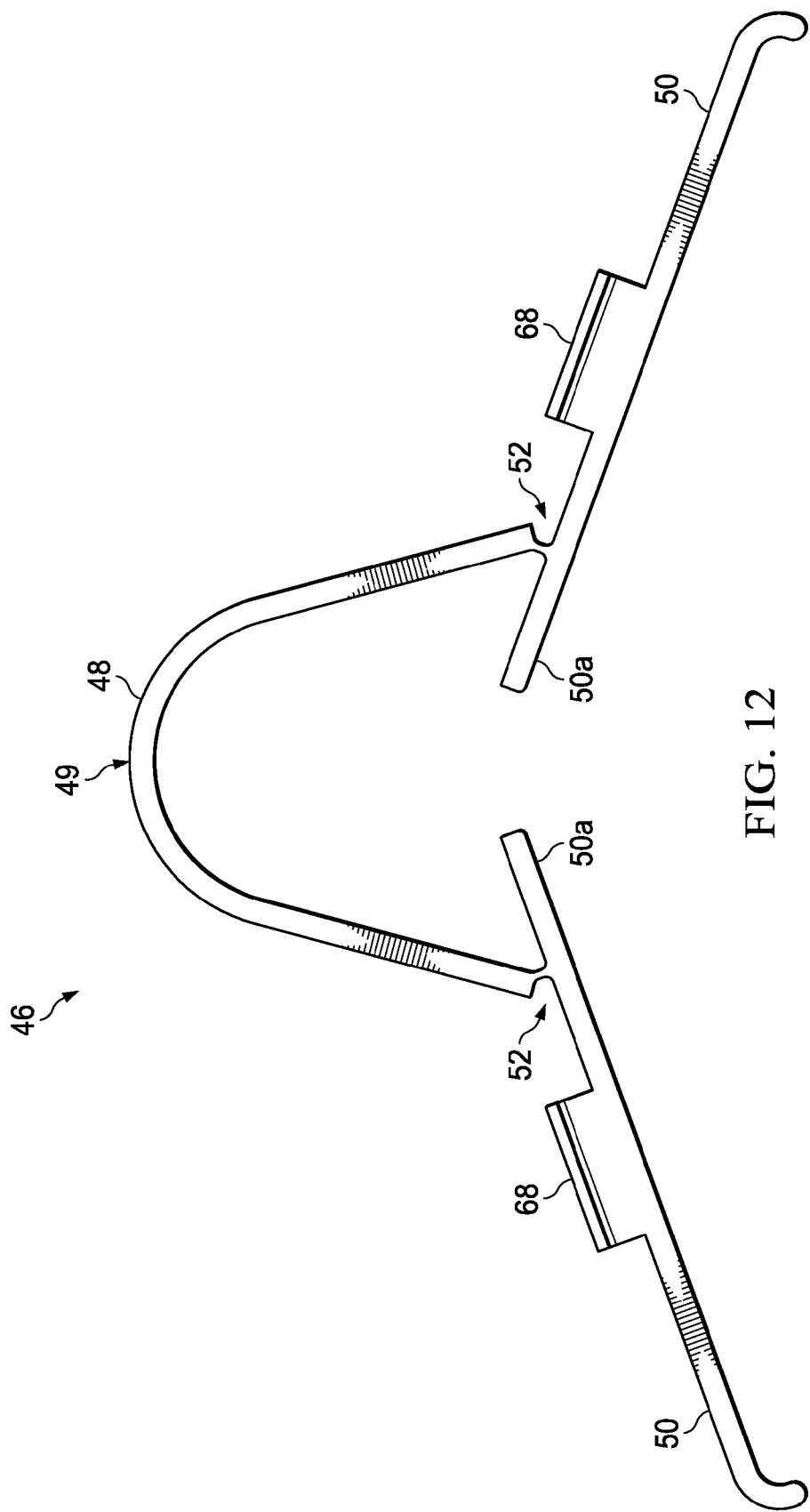
FIG. 12 is an illustration of an end view of the former device shown in FIG. 11.

FIGS. 11 and 12 illustrate an alternate embodiment of a compliant ply former device 46 that may be employed in the process and apparatus previously described. The former device 46 comprises a plurality of former segments 64 that may flex in multiple planes to conform to tools having one or more contours along their length. Each of the former segments 64 includes a body 48 flexibly coupled with laterally extending forming fingers 50 by live hinges 52. "Live hinges" refers to a flexible connection between the body 48 and the forming fingers 50 in which the material forming the flexible connection is itself flexible and integrally formed with the body 48 and the forming fingers 50.

The former segments 64 are flexibly interconnected by a series of flexible segment connections 68 on the forming fingers 50. In this example, the top 49 of the body 48 is rounded, however the top 49 may be flat or may have other shapes, depending upon the application. The former device 46 may be formed of any suitable materials such as various plastics of the type previously mentioned, although it may be possible to fabricate the former device 46 from other materials, including but not limited to composites and metals. In this example of the former device 46, the plies 44 are initially clamped to the cap section 34 of the tool 32 by the inner extremities 50a of the forming fingers 50, thus eliminating the need for a separate clamping member, such as the clamping member 54 shown in FIGS. 2-10.

Figure 13:
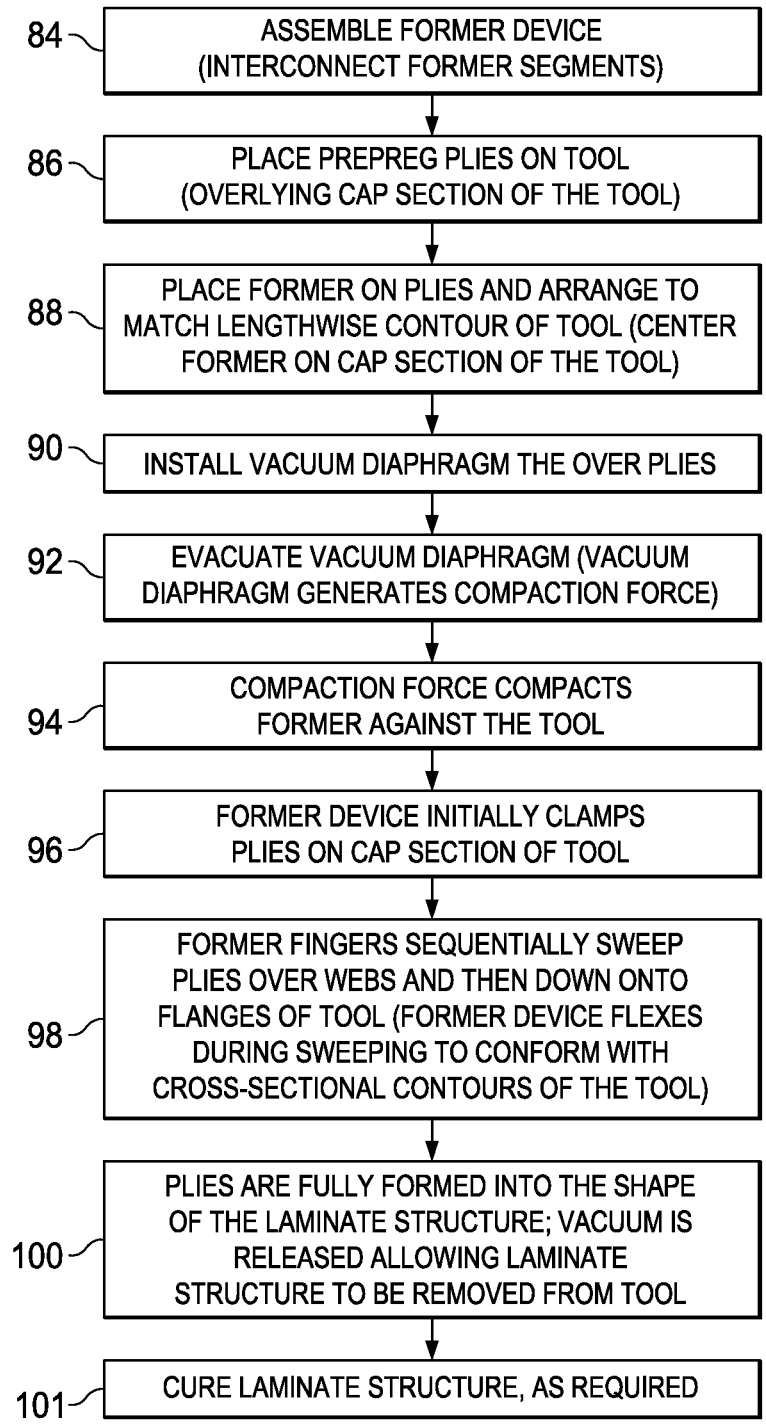
FIG. 13 is an illustration of a flow diagram of a method of vacuum forming composite prepreg plies.

Attention is now directed to FIG. 13 which broadly illustrates the overall steps of a passive method of forming composite laminates using the apparatus 45 and device 46 previously described. Beginning at 84, a flexible, compliant former device 46 is assembled, as by interconnecting a plurality of individual former segments 64. The former segments 64 may be interconnected using snap-fit connections, flexible lines or other techniques that allow the former segments 64 to comply with contours, undulations or other features of a forming tool 32 contoured along its length. In applications where the composite structure being formed is not contoured along its length, for example, a straight stringer having a desired cross-sectional geometry, it may not be necessary to interconnect individual former segments 64, but rather a single or unitary former device 46 may be employed to passively form prepreg plies 44 on a tool 32 by applying a consistent, controlled compaction force to the plies 44.

At 86, one or more prepreg plies 44 are placed on the tool 32, overlying a cap section 34 of the tool 32. At step 88, the former device 46 is placed on the plies 44 and arranged to match the lengthwise contour of the tool 32. As previously mentioned, any of various films and/or bagging materials may be placed over the plies 44 to protect the plies 44 and/or reduce friction and thereby facilitate the forming operation. Next, the former device 46 is placed on the plies 44, with the protective film/bagging material interposed between the former device 46 and the plies 44. Generally, depending upon the application, the former device 46 is centered along the cap section 34 of the tool 32. Next, shown at 90, a flexible vacuum diaphragm 62 is installed over the plies 44, covering the former device 46, and is sealed to form a vacuum chamber containing both the plies 44 and the former device 46. For example, step 90 may be performed by sealing a vacuum bag over the former device 46.

At 92, the vacuum diaphragm 62 is evacuated, causing it to generate a compaction force. At 94, the compaction force generated by the vacuum diaphragm 62 is transmitted to the former device 46, causing the former device 46 to be compacted against the tool 32. At 96, the applied compaction force transmitted through the forming device 46 causes the plies 44 to be clamped to the cap section 34 of the tool 32 thereby holding the plies 44 and maintaining them centered during the subsequent forming steps. The continued application of the compaction force draws the former device 46 down onto the tool 32.

As the former device 46 is drawn down onto the tool 32, flexible fingers 50 on the former device 46 sequentially sweep the plies 44 over the web sections 38 and then down onto the flange sections 36 of the tool 32. Also, as the former device 46 is drawn down, the clamping member 54 along with the guide arms 54*a* compact the plies 44 against the tool 32 and roll them over the upper radius at the intersection of the area 34 and the web 38. The former device 46 deforms as needed during sweeping process in step 98 so as to comply to the cross-sectional contours of the tool 32. The sweeping action of the flexible fingers 50 as well as the amount and deformation of the former device 46 will depend on the cross-sectional geometry of the particular structure being formed, however it is to be understood that the sweeping and deformation occur in a predetermined order that causes the prepreg plies 44 to be formed to the contour of the tool 32. At 100, the plies 44 are fully formed by the former device 46 into the shape of the laminate structure, at which point, the vacuum is released, the forming device 46 is removed and the laminate structure is ready for further processing. The formed laminate structure may be removed from the tool or otherwise prepared for curing. Finally, at 101, the composite laminate structure may be cured, as required, using conventional autoclave or out-of-autoclave processes.

Figure 14:
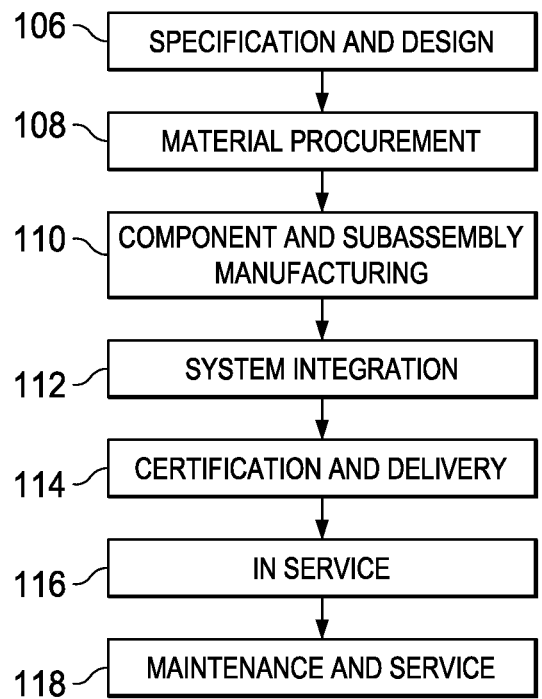
FIG. 14 is an illustration of a flow diagram of aircraft production and service methodology.
Figure 15:
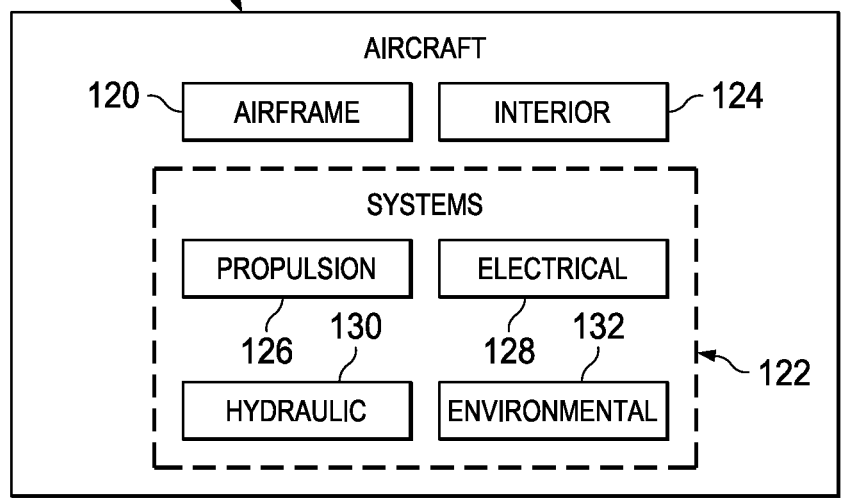
FIG. 15 is an illustration of a block diagram of an aircraft.

Embodiments of the disclosure may find use in a variety of potential applications, particularly in the transportation industry, including for example, aerospace, marine, automotive applications and other application where contoured elongate composite members, such as stringers, spars and other stiffeners may be used. Thus, referring now to FIGS. 14 and 15, embodiments of the disclosure may be used in the context of an aircraft manufacturing and service method 102 as shown in FIG. 14 and an aircraft 104 as shown in FIG. 15. Aircraft applications of the disclosed embodiments may include, for example, without limitation, stringers, spars and other stiffeners, especially those having one or more contours along their length. During pre-production, exemplary method 102 may include specification and design 106 of the aircraft 104 and material procurement 108. During production, component and subassembly manufacturing 110 and system integration 112 of the aircraft 104 takes place. Thereafter, the aircraft 104 may go through certification and delivery 114 in order to be placed in service 116. While in service by a customer, the aircraft 104 is scheduled for routine maintenance and service 118, which may also include modification, reconfiguration, refurbishment, and so on.

Each of the processes of method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 104 produced by exemplary method 102 may include an airframe 120 with a plurality of systems 122 and an interior 124. Examples of high-level systems 122 include one or more of a propulsion system 126, an electrical system 128, a hydraulic system 130 and an environmental system 132. Any number of other systems may be included. Although an aerospace example is shown, the principles of the disclosure may be applied to other industries, such as the marine and automotive industries.

Systems and methods embodied herein may be employed during any one or more of the stages of the production and service method 102. For example, components or subassemblies corresponding to production process 110 may be fabricated or manufactured in a manner similar to components or subassemblies produced while the aircraft 104 is in service. Also, one or more apparatus embodiments, method embodiments, or a combination thereof may be utilized during the production stages 110 and 112, for example, by substantially expediting assembly of or reducing the cost of an aircraft 104. Similarly, one or more of apparatus embodiments, method embodiments, or a combination thereof may be utilized while the aircraft 104 is in service, for example and without limitation, to maintenance and service 118.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for forming a composite laminate structure, comprising:
    a tool having contoured tool surfaces configured to have prepreg plies placed and formed thereon;
    a former device configured to be placed on the prepreg plies and form the plies onto the contoured tool surfaces, the former device including a plurality of forming segments and flexible connections between the forming segments, wherein each of the forming segments is configured to form a portion of the plies on the contoured tool surfaces, and wherein the former device further includes a clamping member configured to clamp the prepreg plies on the tool; and
    a flexible vacuum diaphragm covering the plies, the flexible vacuum diaphragm being configured to be evacuated and compact the former device down onto the tool.

2. The apparatus of claim 1, wherein the flexible connections include flexible lines threaded through the forming segments.

3. The apparatus of claim 1, wherein each of the flexible connections is a snap-fit joint configured to allow one or more of the forming segments to be added or removed from the former device.

4. The apparatus of claim 3, wherein each of the flexible connections includes a cone, and a cup for receiving the cone.

5. The apparatus of claim 1, wherein:
    the tool includes a cap section, a pair of flange sections, and a pair of web sections connecting the flange sections, and
    each of the forming segments includes a body configured to hold the pies against the cap section, and forming fingers configured to sweep the plies over the web sections and onto the flange sections.

6. The apparatus of claim 5, wherein the body includes:
    a spring coupled with the clamping member and configured to bias the clamping member toward the cap section.

7. The apparatus of claim 5, wherein each of the forming segments further includes flexible connections between the forming fingers and the body, wherein the flexible connections are configured to allow the forming fingers to flex relative to the body.

8. The apparatus of claim 1, wherein:
    the body, the flexible connections and the forming fingers are integrally formed together, and
    each of the body, the flexible connections and the forming fingers is flexible.

9. A device for forming prepreg plies onto a contoured tool having a cap section, a pair of flange sections and a pair of web sections connecting the flange sections to the cap section, comprising:
    a body configured to be placed on the plies overlying the cap section;
    a clamping member connected with the body and configured to clamp the plies on the cap section;
    guide arms on the clamping member;
    a pair of forming fingers respectively configured to sequentially sweep the plies over the web sections and down onto the flange sections; and
    a pair of flexible connections respectively connecting the pair of forming fingers with opposite sides of the body.

10. The apparatus of claim 9, wherein the body is flexible.

11. The apparatus of claim 9, wherein each of the flexible connections includes a live hinge.

12. The apparatus of claim 9, wherein each of the forming fingers is flexible and includes inner extremities configured to sweep the plies over the web sections of the tool.

13. The apparatus of claim 9, wherein the body, the forming fingers and the flexible connections are of a unitary one-piece construction.

14. The apparatus of claim 9, further comprising:
    a spring coupled between the body and the clamping member for biasing the clamping member toward the cap section.

15. The apparatus of claim 14, wherein the spring, the clamping member and the guide arms are integrally formed together.

16. A device for forming prepreg plies onto a tool, comprising:
    a body configured to be placed on the plies overlying the tool;
    a pair of forming fingers respectively configured to sequentially sweep the plies over the tool; and
    a pair of flexible connections respectively connecting the pair of forming fingers with opposite sides of the body, wherein the pair of flexible connections includes folds of flexible spring-like material.

17. The device of claim 16, wherein the folds of the flexible spring-like material are formed integral with the forming fingers.

18. The apparatus of claim 16, wherein the flexible connections are attached at medial locations between opposite extremities of the forming fingers.

19. The apparatus of claim 16, wherein the body includes a clamp for clamping the plies on the tool.

20. A method of forming prepreg plies on an elongate tool having a lengthwise contour, comprising:
    assembling a former device, including flexibly connecting a plurality of former segments each configured to form a section of the prepreg plies on the elongate tool;
    placing the prepreg plies on the tool;
    configuring the former device to substantially match the lengthwise contour of the tool;
    compacting the former device against the tool to form the prepreg plies onto the tool;
    sealing a vacuum bag over the plies; and
    generating a compaction force be evacuating the vacuum bag.

* * * * *

UNITED STATES PATENT AND TRADEMARK OFFICE
CERTIFICATE OF CORRECTION

PATENT NO.         : 9,636,876 B2
APPLICATION NO.    : 14/527162
DATED              : May 2, 2017
INVENTOR(S)        : Lee et al.

It is certified that error appears in the above-identified patent and that said Letters Patent is hereby corrected as shown below:

Column 11, Line 50, change "pies" to -- plies --
Column 12, Line 54, change "segments each" to -- segments, each --
      Line 62, change "force be" to -- force by --

Signed and Sealed this
Eighth Day of May, 2018

Andrei Iancu
*Director of the United States Patent and Trademark Office*